C. L. CAMBRIDGE.
POULTRY BROODER.
APPLICATION FILED FEB. 26, 1910.
976,984.
Patented Nov. 29, 1910.
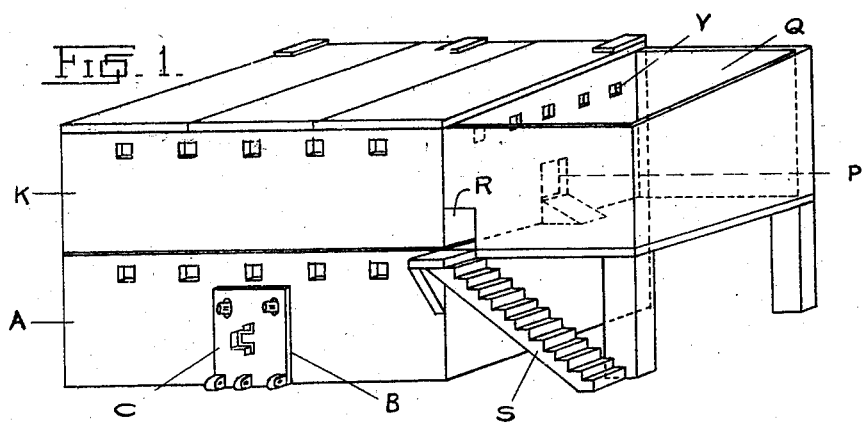
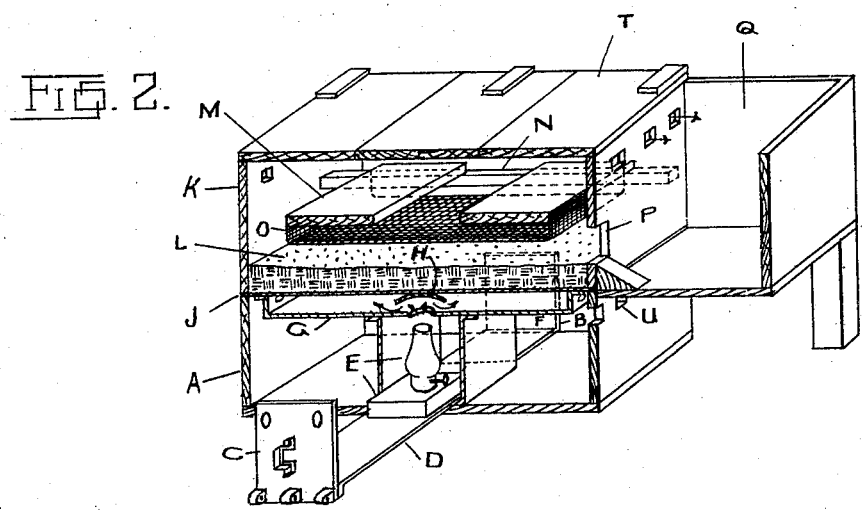
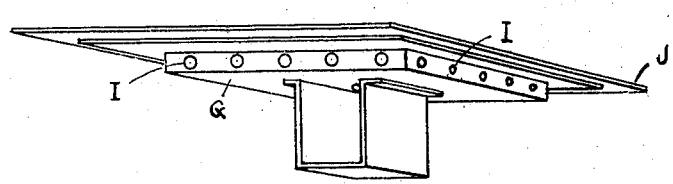
Witnesses
Charles J. Fesler
Harry E. Crane.
Inventor
Charles L. Cambridge
By Frank H. Deaver
Attorney

UNITED STATES PATENT OFFICE.

CHARLES L. CAMBRIDGE, OF HINDSBORO, ILLINOIS.

POULTRY-BROODER.

976,984.  Specification of Letters Patent.  Patented Nov. 29, 1910.

Application filed February 26, 1910. Serial No. 546,293.

*To all whom it may concern:*

Be it known that I, CHARLES L. CAMBRIDGE, a citizen of the United States, residing at Hindsboro, in the county of Douglas and State of Illinois, have invented a new and useful Poultry-Brooder, of which the following is a specification.

My invention relates to improvements in poultry brooders in which a heating device is combined with a heating chamber, a brooding chamber and a feeding compartment; and the objects of my improvement are, first, to provide a brooding chamber, some parts of which are always at the desired temperature; second, an arrangement of the brooding chamber which will permit the young poultry to occupy its floor, either under or beyond the hover cloth, or to perch upon the hover-boards or hover cloth; and third, to provide such an arrangement that will permit the young poultry to travel from the brooding chamber to the feeding chamber and out of the feeding chamber as desired.

I attain these objects by the arrangement and mechanism illustrated in the accompanying drawing, in which, Figure 1. is an outside view of the apparatus, shown in perspective, Fig. 2. is a cross section taken midway between the front and back, and also shown in perspective; Fig. 3. is a detailed view in perspective of the heating chamber.

Similar letters refer to similar parts throughout the several views.

The base A is a rectangular box, having a rectangular opening B at the middle of its front and back, the opening extending from the floor line nearly to the top of the base. The opening B in the front being closed by the hinged door C. on the slide D. which carries the lamp E. The opening in the back of the base is nearly closed by the vertical projection F. of the slide D. The upper plate J. of the heating chamber G. rests upon the top of the base A. into which the body of the heating chamber drops a few inches. A circular opening in the floor of the heating chamber admits heat from the lamp E. vertically below it. A cupped deflector or spreader H is attached to the under surface of the top plate of the heating chamber, directly over the chimney of the lamp, and serves to spread the heated current of air. The top plate J. of the heating chamber also serves as a floor to the brooding chamber K, which rests upon and above it, and is covered by a layer of sand L. The hover boards M. rest upon strips N, at each end of the brooding chamber, and can be separated, tightening the hover cloth O, or can be brought together to let it sag. The hover boards and cloth may be lifted out altogether if desired. The brooding chamber K is covered by a hinged door T, which may be raised to admit light. Openings I in heating chamber G are for the exit of hot air, to insure free circulation of heat within the chamber, openings U in the base A are for the escape of air which has passed through the lamp, openings V in the brooder chamber K are for ventilation of the brooder chamber.

It will thus be seen that young poultry are at liberty to travel around beneath the hover cloth or at the sides, beyond the hover cloth, or to perch upon the hover boards or hover cloth within the brooding chamber. They are also at liberty to pass through the doorway P. into the feeding chamber Q. and from there through the doorway R. out of the feeding chamber, and down the steps S.

I am aware that prior to my invention, poultry brooders have been made with a brooding chamber, a heating chamber and a heating device. I therefore do not claim such a combination broadly; but

I claim:

1. The combination, in a poultry brooder, of a brooding chamber having slidable and removable hover-boards and hover-cloth, a heating chamber having a deflecting plate shaped to the form of a segment of a hollow sphere, directly below which is a circular opening to admit heat from a lamp beneath, all substantially as described.

2. In a poultry brooder, the combination, of a heating chamber, with a lamp, a lamp-slide and a base, the heating chamber having an upper plate of length and width to correspond with length and width of base and resting thereon, the body of the chamber hanging within the base, there being a channel attached to the under surface of the heating chamber into which the lamp-slide is placed, thus affording a shield around the lamp, all substantially as illustrated.

CHARLES L. CAMBRIDGE.

Witnesses:
JOHN B. WALLACE,
CHARLES E. CONNER.